United States Patent
Farthofer et al.

(10) Patent No.: US 11,143,086 B2
(45) Date of Patent: Oct. 12, 2021

(54) WORKING VEHICLE HAVING AN OUTLET-SIDE COOLING-AIR DEFLECTION INSTALLATION

(71) Applicant: WACKER NEUSON LINZ GMBH, Hoershing (AT)

(72) Inventors: Dieter Farthofer, Ansfelden (AT); Johannes Peterseil, Katsdorf (AT); Markus Schauer, Aigen (AT)

(73) Assignee: WACKER NEUSON LINZ GMBH, Hoershing (AT)

( * ) Notice: Subject to any disclaimer, the term of this patent is extended or adjusted under 35 U.S.C. 154(b) by 0 days.

(21) Appl. No.: 16/386,224

(22) Filed: Apr. 16, 2019

(65) Prior Publication Data

US 2019/0323412 A1 Oct. 24, 2019

(30) Foreign Application Priority Data

Apr. 20, 2018 (EP) .................................... 18168563

(51) Int. Cl.
| | |
|---|---|
| *F01P 5/06* | (2006.01) |
| *B60K 11/06* | (2006.01) |
| *B60K 11/08* | (2006.01) |
| *F01P 7/02* | (2006.01) |
| *F01P 11/10* | (2006.01) |

(52) U.S. Cl.
CPC ............... *F01P 5/06* (2013.01); *B60K 11/06* (2013.01); *B60K 11/08* (2013.01); *F01P 7/02* (2013.01); *F01P 11/10* (2013.01); *B60Y 2200/20* (2013.01)

(58) Field of Classification Search
CPC ..... F01P 5/06; F01P 7/02; B60K 11/06; B60K 11/08
See application file for complete search history.

(56) References Cited

U.S. PATENT DOCUMENTS

| | | |
|---|---|---|
| 3,786,981 A | 1/1974 | Davis |
| 5,193,636 A | 3/1993 | Holm |
| | (Continued) | |

FOREIGN PATENT DOCUMENTS

EP 3211142 A2 8/2017

OTHER PUBLICATIONS

Neumaier Industry, Jul. 30, 2016, https://web.archive.org/web/20160730135555/https://www.neumaier-industry.com/en/systemtechnik/produkte-linde/drehkabine-fuer-schwerlast-stapler.php, "Rotating cabin for heavy forklift trucks—optimum circumferential visibility and safety") (Year: 2016).*

(Continued)

*Primary Examiner* — Kevin A Lathers

(57) ABSTRACT

A work vehicle has an internal combustion engine that is disposed in an engine bay, an operator space that is disposed above the engine bay, and a cooling-air installation. The air cooling installation has a cooling-air inlet, a cooling-air outlet, a cooling-air blower, as well as a cooler that in the flow path of the cooling air through the engine bay is disposed between the cooling-air inlet and the cooling-air outlet. In terms of a direction of primary travel of the work vehicle, the cooling-air inlet of the engine bay is provided on a first (lateral) vehicle side and/or vehicle lower side, and the cooling-air outlet of the engine bay is provided on a vehicle front side The cooling-air outlet has a cooling-air deflection installation which is configured such that exiting cooling air is guided in the direction of a second (lateral) vehicle side.

13 Claims, 3 Drawing Sheets

(56) References Cited

U.S. PATENT DOCUMENTS

| | | | |
|---|---|---|---|
| 5,660,244 A * | 8/1997 | Matsuda | B60K 11/04 |
| | | | 180/68.1 |
| 6,142,108 A * | 11/2000 | Blichmann | F01P 7/026 |
| | | | 123/41.05 |
| 7,131,422 B2 | 11/2006 | Kimura et al. | |
| 9,452,674 B2 * | 9/2016 | Adamson | B60K 11/06 |
| 2003/0057005 A1 | 3/2003 | Nagai et al. | |

OTHER PUBLICATIONS

"Expert Iron Sales 3001 Wacker Neuson Dumper Demo," Feb. 4, 2014, https://www.youtube.com/watch?v=E_wWeJiZ0FA (Year: 2014).*

* cited by examiner

WORKING VEHICLE HAVING AN OUTLET-SIDE COOLING-AIR DEFLECTION INSTALLATION

BACKGROUND OF THE INVENTION

1. Summary of the Invention

The invention relates to a work vehicle having an internal combustion engine that is disposed in an engine bay, and an operator space that is disposed above the engine bay.

2. Discussion of the Related Art

In the case of work vehicles of this type, cooling air for the engine bay is usually sucked through a cooler by means of a cooling-air blower. The cooling-air blower subsequently conveys or pushes, respectively, the cooling air through the engine bay, wherein the cooling air departs the engine bay at a cooling-air outlet.

In the case of such a construction of a cooling-air installation, suctioned cooling air is very intensely heated by the cooler. The already intensely heated cooling air then, below the operator space or a driver cabin, respectively, flows into the engine bay so that noticeable heating of the operator space or the driver cabin, respectively, arises. Furthermore, the engine bay is also additionally heated. In the case of cooling-air installations of this type the effect of intensely heated cooling air that is ejected from the engine bay being suctioned yet again can arise, depending on the travel direction. Sufficiently cold air for thermal control is thus not available, which can lead to overheating.

SUMMARY

The object on which the invention is based is seen in specifying a work vehicle in which improved cooling of the engine bay is enabled.

This object is achieved by providing a work vehicle having an internal combustion engine that is disposed in an engine bay, an operator space that is disposed above the engine bay; and a cooling-air installation. The air cooling installation has a cooling-air inlet, a cooling-air outlet, a cooling-air blower, as well as a cooler that in the flow path of the cooling air through the engine bay is disposed between the cooling-air inlet and the cooling-air outlet. In terms of a direction of primary travel of the work vehicle, the cooling-air inlet of the engine bay is provided on a first (lateral) vehicle side and/or vehicle lower side, and the cooling-air outlet of the engine bay is provided on a vehicle front side The cooling-air outlet has a cooling-air deflection installation which is configured such that exiting cooling air is guided in the direction of a second (lateral) vehicle side.

In one embodiment, the cooling-air flow (in a plan view) exits at an oblique angle to the direction of primary travel such that said cooling-air flow is guided to one side of the vehicle. Exiting cooling air in a movement of the work vehicle in the direction of primary travel is thus already deflected in the cooling-air outlet such that said cooling air on account of the travel airstream flowing toward the cooling-air outlet is almost entirely displaced toward the second (lateral) vehicle side. Accordingly, heated cooling air escaping from the engine bay is not suctioned yet again, because the cooling-air inlet is situated on the other (lateral) vehicle side (first side of the vehicle) and/or on the vehicle lower side. Fresh, cooler ambient air is thus suctioned through the cooling-air inlet at all times.

In one implementation, the cooling-air blower, in terms of the cooling-air flow, can be disposed upstream of the cooler and downstream of the internal combustion engine. Air which has been somewhat heated in the engine bay and is situated in the engine bay is thus conveyed through the cooler. It is thus prevented that air flowing in for the purpose of cooling the engine bay is initially heated in the cooler. A thermal overload can accordingly be excluded.

The cooler in terms of the cooling-air flow can be disposed upstream of the cooling-air outlet and downstream of the cooling-air blower. It is guaranteed, on account thereof, that cooling air that has passed through the cooler can depart the engine bay by way of a short pass through the cooling outlet.

This results in that the cooling-air inlet is disposed upstream of the cooling-air blower, wherein the internal combustion engine in the flow path of the cooling air is disposed between the cooling-air inlet and the cooling-air blower. Sufficiently cool air is thus suctioned directly by the cooling-air blower from the environment of the work vehicle into the engine bay, without the freshly suctioned air initially passing the cooler and being heated.

The cooling-air deflection installation can have a plurality of air baffles which are disposed in the cooling-air outlet and which are disposed so as to be inclined in terms of a flow cross section plane through the cooling-air outlet. The inclined air baffles enable a targeted deflection of exiting cooling air.

The air baffles in the cooling-air outlet herein can be disposed so as to be substantially vertical and mutually parallel. The air baffles thus form upright flow obstacles that are rotated or inclined, respectively, about a vertical axis and deflect the cooling-air flow to one side.

The air baffles can form an acute angle in relation to an imaginary straight line that lies in the flow cross section plane and runs so as to be substantially horizontal and parallel with a vehicle front axle, said angle being on the air-baffle side that faces away from the first vehicle side. The acute angle can be approximately 25° to 60°, preferably approximately 35° to 50°. It is guaranteed on account thereof that the outflowing cooling air is deflected to a sufficient extent to the desired side, without an outflow opening that exists between two neighboring air baffles having an insufficient flow cross section which heavily impedes the escape of cooling air.

The internal combustion engine can be installed so as to have the driving axis thereof in the longitudinal direction of the work vehicle. This enables an installation which in terms of the longitudinal axis of the vehicle is laterally offset. The internal combustion engine herein can be disposed so as to be closer to the first vehicle side, for example, where the cooling-air inlet is also disposed, such that inflowing ambient air immediately flows around the internal combustion engine.

The operator space can be accommodated in a cabin. The cabin herein can have a cabin access that is disposed on the second vehicle side. The cabin access can be a pivotable door, for example. It is ensured on account thereof that the cooling-air inlet on the first vehicle side is permanently clear. This is also the case when the cooling-air inlet is situated on the vehicle lower side.

The work vehicle can be a dumper having a tipper body that in terms of the direction of primary travel is disposed behind the operator space. It is ensured on account thereof that the tipper body which is filled with material and obscures the view does not restrict the field of view of the driver, in particular in the case of comparatively long transport trips using the dumper.

The operator space can be rotatable by 180° in such a manner that the operator space is capable of being aligned and fixed either in the direction of primary travel or counter to the direction of primary travel. The operator space can thus be aligned according to the requirements, depending on the work to be carried out or the travel distance, respectively.

In the case of the operator space being protected or surrounded, respectively, by the cabin already mentioned, the operator space can be rotatable relative to the cabin. This means that the cabin remains fixedly connected to the work vehicle or the body of the latter, respectively, while the operator space can be rotated conjointly with corresponding operating elements such as a steering wheel, foot pedals, and other operating elements.

BRIEF DESCRIPTION OF THE DRAWINGS

Further advantages, features, and details of the invention are derived from the description hereunder of an exemplary embodiment and by means of the drawings in which.

DETAILED DESCRIPTION

Figure 1:
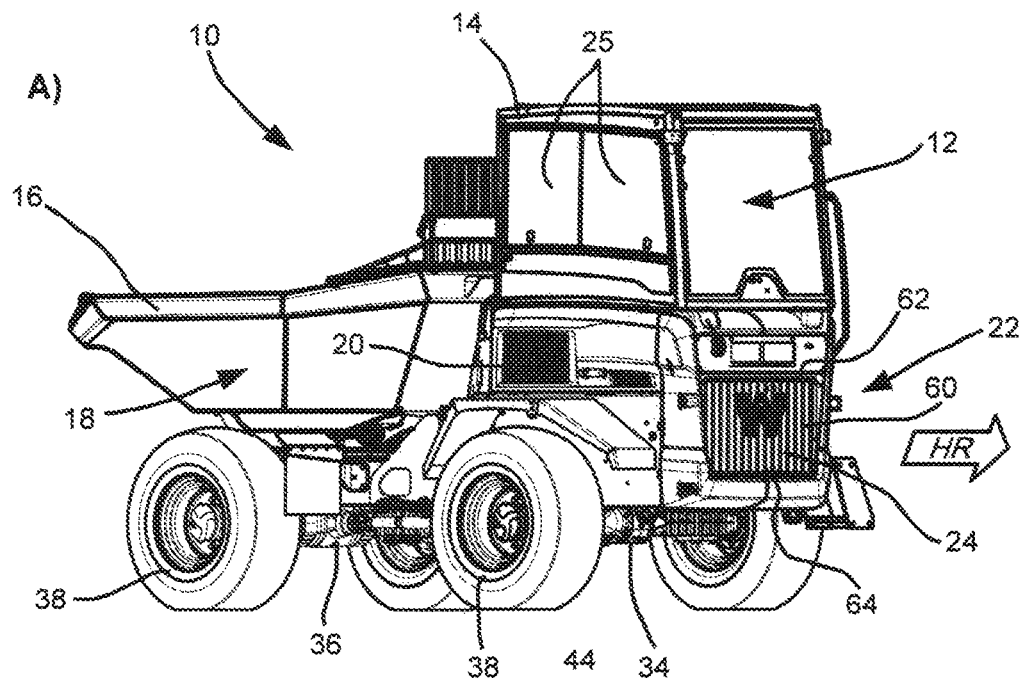
FIG. 1 in the part-figures A) and B) shows two schematic perspective illustrations of a work vehicle from different sides.
Figure 1:
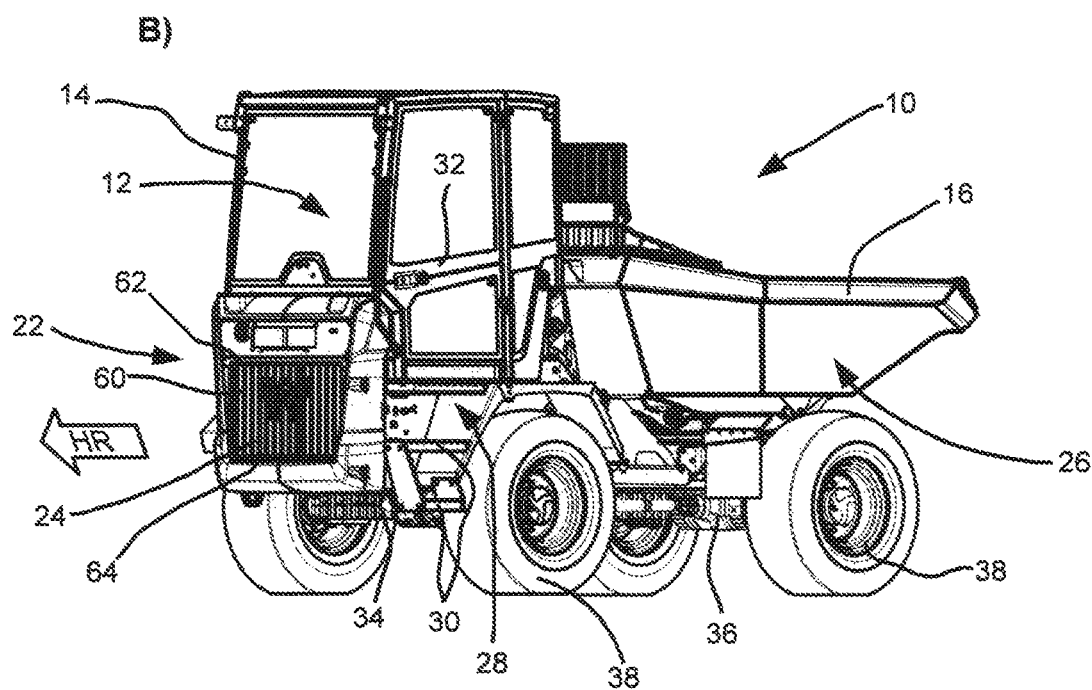

A work vehicle 10 in a respective perspective illustration is shown schematically and simplified in the part-figures A) and B) in FIG. 1. The work vehicle 10 here in an exemplary manner is a so-called dumper. An operator space 12 of the work vehicle 10 in the present example is disposed in a cabin 14. The cabin 14 is optional, and the work vehicle 10 can also be embodied having an operator space 12 without a cabin 14. The operator space 12 in terms of a direction of primary travel HR lies in front of a tipper body 16 of the work vehicle 10.

A cooling-air inlet 20 is disposed on a first vehicle side 18 (FIG. 1A) of the work vehicle 10, said first vehicle side 18 in the present example corresponding to the right side in terms of the direction of primary travel HR. The cooling-air inlet 20 is an opening provided on the body or on cladding parts 44, respectively, of the work vehicle 10, an engine bay (not visible) being situated behind said cooling-air inlet 20 in FIG. 1. A cooling-air outlet 24 is disposed on the vehicle front side 22. The cooling-air outlet 24 is also an opening toward the engine bay (not visible), said opening being provided on the body or on cladding parts, respectively, of the work vehicle 10. In the illustrated example of the work vehicle 10 having a cabin 14, it is also to be pointed out that the cabin on the first vehicle side 18 has two sliding windows 25 which are movable relative to one another.

An access 28 to the operator space 12 or the cabin 14, respectively, is provided on a second vehicle side 26 (FIG. 1B) of the work vehicle. In the present example the access 28 to the operator space 12 comprises a plurality of steps or treads 30, respectively, and one cabin door 32.

For the sake of completeness it is also to be noted that the work vehicle 10 has a front axle 34 and a rear axle 36, wherein two wheels 38 are attached to each axle.

Figure 2:
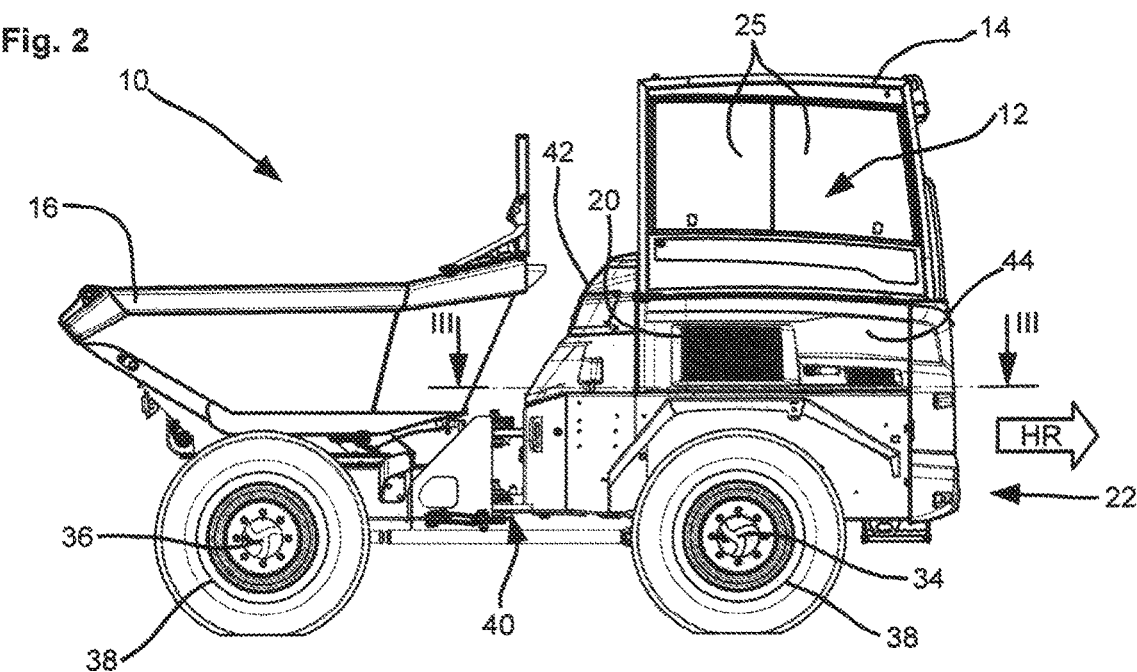
FIG. 2 shows the work vehicle of FIG. 1 in a simplified, schematic illustration in a lateral sectional illustration.

FIG. 2 shows a simplified and schematic section of the first (right) vehicle side 18. It is to be pointed out that reference signs already known from FIG. 1 are illustrated in FIG. 2, even when the respective elements of the work vehicle are not described once again. It can be seen from the illustration of FIG. 2 that the work vehicle 10 has an articulation assembly 40 between the front axle 34 and the rear axle 36, said articulation assembly 40 being able to be activated in a known manner so as to be able to perform changes of the direction in the travel of the work vehicle 10. A body assembly or cladding assembly 42, respectively, which is configured in the manner of a hood can be seen above the front axle 34, the engine bay being situated below said body assembly or cladding assembly 42, respectively. The cooling-air inlet 20 which in the drawing is illustrated as a black area is configured in a lateral cladding component 44.

Figure 3:
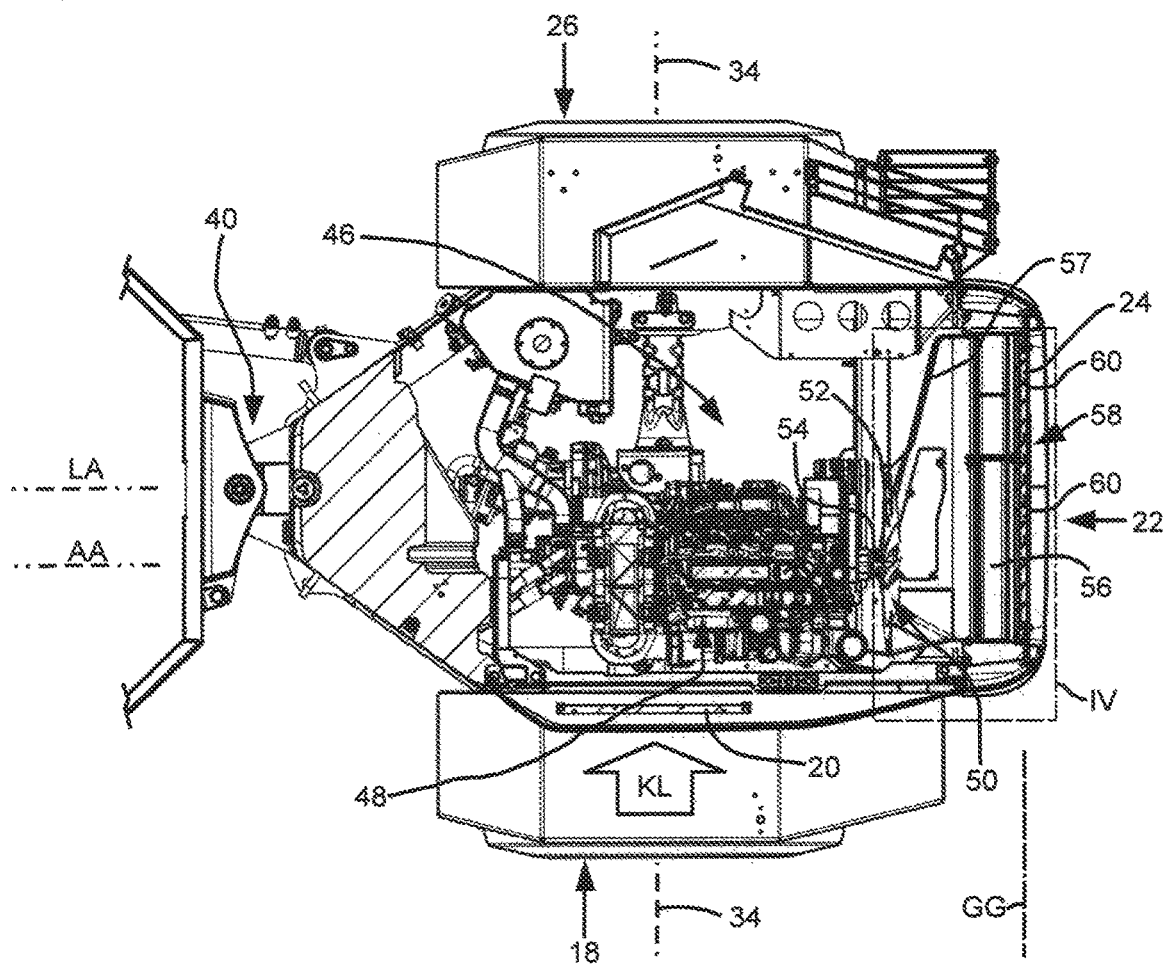
FIG. 3 shows a sectional illustration through an engine bay of the work vehicle, corresponding to the section line III-III of FIG. 2.

FIG. 3 shows a sectional illustration through the front part of the work vehicle 10 at the height level of the section line III-III in FIG. 2. In this illustration, there is a clear view onto the engine bay 46 already mentioned. An internal combustion engine 48 is accommodated in the engine bay 46, said internal combustion engine 48 potentially being a diesel engine, for example. A cooling-air blower 50 is connected to the internal combustion engine 48. The cooling-air blower 50 has in particular a ventilator 52 which by means of a shaft 54 is coupled to the internal combustion engine such that the ventilator 52 in the case of the running internal combustion engine is set in rotation. The cooling-air blower 52 is usually connected to a drive of a cooling-water pump installation of the internal combustion engine 48.

The cooling-air blower 50 is embodied in such a manner that cooling air KL from the environment of the work vehicle 10 is suctioned through the cooling-air inlet 20 into the engine bay 46 by means of the ventilator 52. The suctioned cooling air KL serves for cooling the engine bay 46 and the internal combustion engine 48. The cooling air KL is conveyed through the cooling-air blower 50 to the cooling-air outlet 24 that is disposed in the vehicle front side 22. The cooling air KL herein is pushed or conveyed, respectively, through a cooler 56 by means of the cooling-air blower 50.

The cooler 56 is disposed upstream of the cooling-air outlet 24 and downstream of the cooling-air blower 50. Separation walls 57 are disposed between the cooler 56 and the internal combustion engine 48, said separation walls 57 being configured in the manner of a funnel toward the cooling-air blower 50. It is guaranteed on account thereof that cooling air KL that is conveyed through the cooling-air blower 50 in the direction toward the cooler 56 can be reliably conveyed through the cooling-air outlet 24 out of the engine bay 46 and thus does not re-enter the engine bay 46.

Figure 4:
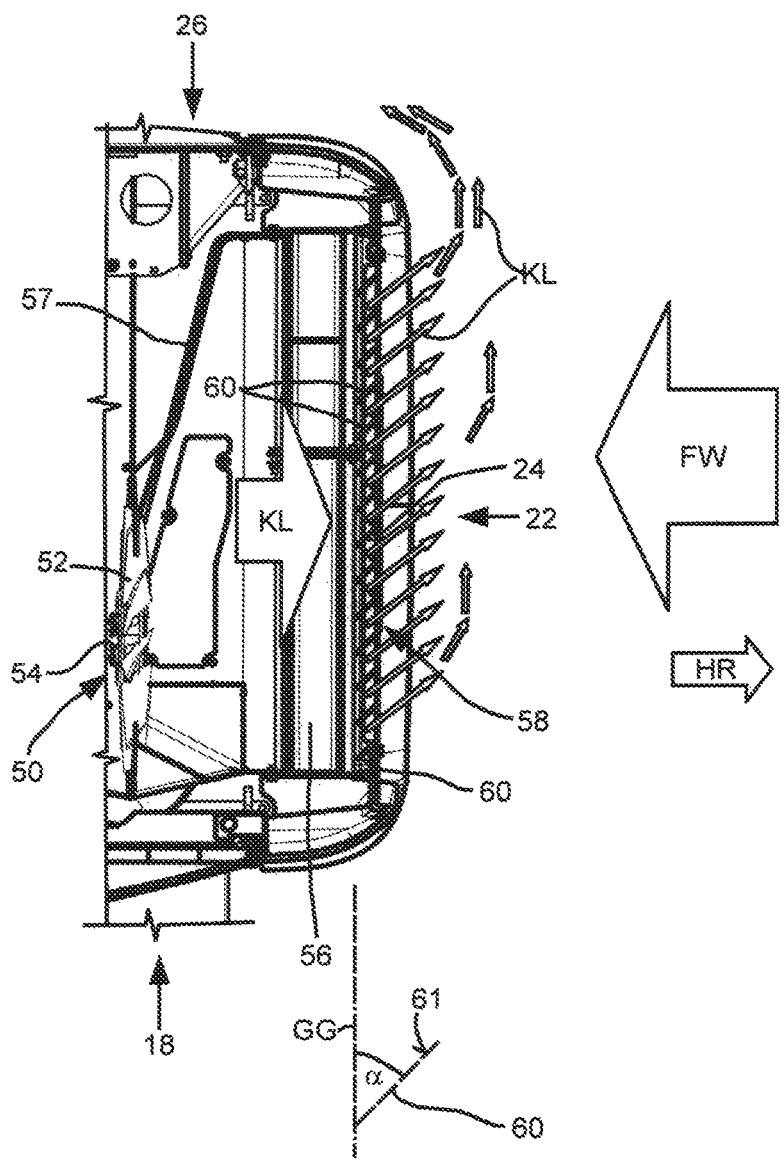
FIG. 4 shows an enlarged illustration of a cooling-air outlet, corresponding to the region IV that is bordered by dashed lines in FIG. 3.

FIG. 4 shows an enlarged illustration of the cooling-air blower 50, the cooler 56, and the cooling-air outlet 24, corresponding approximately to the rectangle IV that is illustrated in dashed lines in FIG. 3.

The cooling-air outlet 24 has a cooling-air deflection installation 58 which is specified for allowing exiting cooling air KL to flow out in a predetermined direction. The cooling-air deflection installation 58 comprises a plurality of air baffles 60. The air baffles 60 extend in a substantially vertical direction from an upper periphery 62 of the cooling-air outlet 24 to a lower periphery 64 of the cooling-air outlet 24 (see FIG. 1).

The air baffles 60 are disposed so as to be inclined in terms of an imaginary straight line GG which lies in a plane of the flow cross section of the cooling-air outlet 24. An acute angle α is formed herein between the imaginary straight line and the air baffles 60, wherein said angle is measured on that side 61 of the air baffles 60 that faces away from the first vehicle side 18. The angle is approximately 25° to 60°, preferably approximately 35° to 50°. The angle in the present example is approximately 44° to 46°. The imaginary straight line GG runs so as to be substantially horizontal and parallel with the vehicle front axle 34, which can be seen in FIG. 3, wherein the vehicle front axle 34 is illustrated in a representative manner by a chain-dotted line.

Cooling air KL that is conveyed by the cooling-air blower 50 through the cooler 56 is deflected by the cooling-air deflection installation 58 in the direction of the second vehicle side 26. When the work vehicle moves forward, thus in the direction of primary travel HR of said work vehicle, the travel airstream FW flows toward the cooling air KL that is conveyed out of the cooling-air outlet 24. Since the cooling air KL exits so as to already be deflected, the flow of the heated cooling air away in the direction of the second vehicle side 26 is facilitated. It can be ensured on account thereof that heated cooling air KL that has exited the engine bay 46 can no longer make its way to the proximity of the cooling-air inlet 20 on the first vehicle side 18. Accordingly, cool ambient air is reliably suctioned through the cooling-air inlet 20 so that sufficient cooling of the engine bay 46 and the internal combustion engine 48 is enabled.

It can also be seen from FIG. 3 that the internal combustion engine 48 is installed so as to have the driving axis AA thereof in the longitudinal direction of the work vehicle 10, this enabling an installation that in terms of the longitudinal axis LA of the work vehicle 10 is laterally offset. In the present example, the internal combustion engine 48 is disposed so as to be closer to the first vehicle side 18 where the cooling-air inlet 20 is also disposed, such that inflowing cooling air KL immediately flows around the internal combustion engine 48.

For the sake of completeness it is also to be pointed out that the operator space 12 can be rotatable by 180° in such a manner that said operator space is capable of being aligned and fixed either in the direction of primary travel HR or counter to the direction of primary travel HR. The operator space 12 can thus be aligned according to the requirements, depending on the work to be carried out or the travel distance, respectively. In the example illustrated, the operator space 12 is protected or surrounded, respectively, by the cabin 14. In such a case, the operator space 12 is rotatable relative to the cabin 14. This means that the cabin 14 remains fixedly connected to the work vehicle 10 or to the body of the latter, respectively, while the operator space 12 can be rotated conjointly with corresponding operating elements such as a steering wheel, foot pedals, and other operating elements.

The invention claimed is:

1. A work vehicle comprising:
an internal combustion engine that is disposed in an engine bay;
an operator space that is disposed above the engine bay; and
a cooling-air installation having a cooling-air inlet, a cooling-air outlet, a cooling-air blower, and a cooler that, in the flow path of cooling air (KL) flow through the engine bay, is disposed between the cooling-air inlet and the cooling-air outlet,
wherein,
in terms of a direction of primary travel (HR) of the work vehicle, the cooling-air inlet of the engine bay is provided on a first vehicle side and/or a vehicle lower side, and
the cooling-air outlet of the engine bay is provided on a vehicle front side, and wherein
the cooling-air outlet has a cooling-air deflection installation which is configured such that exiting cooling air (KL) is guided in the direction of a second vehicle side.

2. The work vehicle as claimed in claim 1, wherein the cooling-air blower, in terms of the cooling-air flow, is disposed upstream of the cooler and downstream of the internal combustion engine.

3. The work vehicle as claimed in claim 1, wherein the cooler, in terms of the cooling-air flow, is disposed upstream of the cooling-air outlet and downstream of the cooling-air blower.

4. The work vehicle as claimed in claim 1, wherein the cooling-air deflection installation has a plurality of air baffles which are disposed in the cooling-air outlet and which are disposed so as to be inclined in terms of a flow cross section plane through the cooling-air outlet.

5. The work vehicle as claimed in claim 4, wherein the air baffles in the cooling-air outlet are disposed so as to be substantially vertical and mutually parallel.

6. The work vehicle as claimed in claim 4, wherein the air baffles form an acute angle (α) in relation to an imaginary straight line (GG) that lies in a flow cross section plane and that runs so as to be substantially horizontal and parallel with a vehicle front axle, said angle (α) being on an air-baffle side that faces away from the first vehicle side.

7. The work vehicle as claimed in claim 1, wherein the internal combustion engine is installed so as to have the driving axis (AA) thereof in a longitudinal direction of the work vehicle.

8. The work vehicle as claimed in claim 1, wherein the operator space is accommodated in a cabin.

9. The work vehicle as claimed in claim 8, wherein the cabin has a cabin access that is disposed on the second vehicle side.

10. The work vehicle as claimed in claim 1, wherein the work vehicle is a dumper having a tipper body that, in terms of the direction of primary travel (HR), is disposed behind the operator space.

11. The work vehicle as claimed in claim 1, wherein the operator space is rotatable by 180° in such a manner that the operator space is capable of being aligned and fixed either in the direction of primary travel or counter to the direction of primary travel.

12. The work vehicle as claimed in claim 1, wherein the operator space is accommodated in a cabin, wherein the operator space is rotatable by 180° in such a manner that the operator space is capable of being aligned and fixed either in the direction of primary travel or counter to the direction of primary travel, and wherein the operator space is rotatable relative to the cabin.

13. A work vehicle comprising:
an internal combustion engine that is disposed in an engine bay;
an operator space that is disposed above the engine bay; and
a cooling-air installation having a cooling-air inlet, a cooling-air outlet, a cooling-air blower, and a cooler that, in the flow path of cooling air (KL) flow through the engine bay, is disposed between the cooling-air inlet and the cooling-air outlet, wherein, in terms of a direction of primary travel (HR) of the work vehicle, the cooling-air inlet of the engine bay is provided on a first vehicle side and/or a vehicle lower side, and the cooling-air outlet of the engine bay is provided on a vehicle front side, wherein the cooling-air outlet has a cooling-air deflection installation which is configured such that exiting cooling air (KL) is guided in the direction of a second vehicle side, and wherein the cooling-air deflection installation has a plurality of air baffles which are disposed in the cooling-air outlet and which form an acute angle (a) in relation to an imaginary straight line (GG) that lies in a flow cross section plane and that runs so as to be substantially horizontal and parallel with a vehicle front axle, the angle (a) being on an air-baffle side that faces away from the first vehicle side and toward the second vehicle side.

\* \* \* \* \*